UNITED STATES PATENT OFFICE.

HERMAN SCHLUNDT, OF COLUMBIA, MISSOURI.

EXTRACTION OF RADIUM FROM CARNOTITE ORES, &c.

1,181,411. Specification of Letters Patent. Patented May 2, 1916.

No Drawing. Application filed September 24, 1915. Serial No. 52,485.

*To all whom it may concern:*

Be it known that I, HERMAN SCHLUNDT, a citizen of the United States, residing at Columbia, county of Boone, State of Missouri, have invented certain new and useful Improvements in Extraction of Radium from Carnotite Ores, &c.; and I do hereby declare the following to be a full, clear, and exact description of the invention, such as will enable others skilled in the art to which it appertains to make and use the same.

My invention relates to the extraction and recovery of radium from carnotite ores and concentrates, and from other suitable radium-containing material, by means of concentrated sulfuric acid.

I have found that a selective extraction of radium can be effected from carnotite ores and concentrates, and from other suitable radium-containing material, by treating the same with concentrated sulfuric acid, and that the radium sulfate, together with the barium sulfate, which are soluble in the hot concentrated sulfuric acid and extracted thereby, can be separated practically completely from the concentrated acid solution by simply diluting with water.

The nature and advantages of the invention will more clearly appear from the following detailed description.

The powdered ore, ground to pass through a 20-mesh sieve, is boiled with concentrated sulfuric acid of about 60° Baumé or stronger, until a temperature of about 230° C., or higher, is reached. The acid may be either crude acid, or partially refined, or chemically pure. The barium and radium compounds of the ore, together with more or less of other constituents, are dissolved, and are held in solution in the excess of sulfuric acid.

The acid liquor containing the radium values in solution is then separated from the insoluble residue as completely as possible. This separation is advantageously effected while the solution is still hot, e. g., at 100° C. or higher, as by the ordinary process of filtration. The residue is then washed with a further amount of concentrated sulfuric acid. From the clear acid liquors thus obtained, the radium is recovered by diluting with water, whereby radium-barium sulfate is precipitated, owing to its insolubility in the dilute sulfuric acid. The volume of water used for diluting the acid and precipitating these sulfates will depend somewhat on the amounts of some of the constituents of the ore, and particularly calcium compounds. Since it is desirable to obtain a radium-barium sulfate as free as possible from calcium sulfate, the dilution should be carried only to the point where the calcium compounds remain in solution. In practice, therefore, the acid liquor is diluted with 5 or 10 times its volume of water, or, better, water containing in solution a small quantity of some soluble barium salt. By means of this dilution, a radium-barium sulfate is obtained in the form of a precipitate, containing the radium values formerly held in solution in the concentrated acid.

Instead of recovering the radium from the concentrated acid liquor after treatment of one charge of ore, this liquor may be used for the extraction of radium from a second and even a third charge of ore, before the radium is recovered by dilution of the acid liquor with water. This is particularly advantageous in treating low grade ores containing small amounts of radium. By treating further charges of ore with the same hot acid liquor, its radium content is correspondingly increased, and a corresponding saving in the concentrated acid is at the same time effected.

The insoluble residue after separation of the acid still retains some of the acid, as well as the major part of the uranium and vanadium values of the ore. By washing this insoluble residue with water, there is obtained a blue liquor containing in solution vanadium and uranium compounds. From this liquor a precipitate gradually settles out containing a further amount of the radium-barium sulfate. The residue remaining after extraction with water consists largely of silica and silicates.

Small amounts of uranium and vanadium are brought into solution by the concentrated sulfuric acid, so that, after dilution of this acid and precipitation of the radium-barium sulfate, the dilute acid will still contain the uranium and vanadium in solution, and will have a green color due particularly to the presence of the vanadium compounds. By concentrating this dilute acid liquor, it may be made available for extracting further amounts of the ore. Also, upon concentration the vanadium and uranium compounds tend to crystallize out, particularly when the more concentrated liquor is cooled. Uranium and vanadium compounds can thus be obtained and further purified in any suitable manner. The sulfuric acid can be concentrated to the desired extent before reuse.

In treating the ore, it is sometimes desirable to start the digestion with acid which is more dilute than 60° Bé. In order, however, to get a high extraction, the treatment must be continued until the acid becomes more concentrated, e. g., until the temperature reaches 230° C. or higher. Thereby the process becomes substantially the equivalent of the process in which concentrated acid is used from the outset. It may, however, be more advantageous, in some instances, to start with a more dilute solution, and to effect the concentration in the presence of the ore, and thereby obtain the extractive effect of the acid during concentration. The concentration of the diluted acid, after removal of the radium-barium sulfate, can be combined with the extraction of the ore, in this manner. Small amounts of other acids, such as hydrochloric acid or nitric acid, may be added to the sulfuric acid, and may be present during the process, without materially impairing the extraction process, and even, in some instances, with improved results.

The process of the present invention is particularly valuable for extracting carnotite ores; but it is equally available for the extraction of carnotite concentrates; and can be applied to other suitable ores or materials such as samarskite. By treating samarskite containing 12.6% of uranium oxid ($U_3O_8$), which has been ground to pass through an 80 mesh sieve, extraction of as high as 75% of the radium can be obtained.

The following specific examples further illustrate the process of the present invention as applied, respectively, to a high grade, and to a low grade, carnotite ore.

Example 1: One kilo of powdered high grade, carnotite ore, containing 11.9% of uranium oxid, $U_3O_8$, and a total of about $3.31 \times 10^{-5}$ g. radium is boiled for about one hour with two liters of crude sulfuric acid, of 60° Bé. until the temperature reaches about 260° C. The acid liquor is separated from the insoluble residue by filtration, and the residue is washed with one liter of fresh acid of 60° Bé. Upon dilution with eight volumes of water, a precipitate of radium-barium sulfate is obtained weighing about 10.85 g., and containing about 82% of the radium in the ore. The insoluble residue is then washed with water and from the resulting water solution a further precipitate of the radium-barium sulfate is obtained weighing about 2.9 g. and containing about 4.8% of the radium. Hence, in the combined sulfates, about 86.8% of the radium of the ore is recovered.

Example 2: A charge of 10 kilos of low grade carnotite ore bearing 1.7% of uranium oxid, $U_3O_8$, and $4.42 \times 10^{-5}$ g. radium per kilo of ore, is boiled for one hour with 18 liters of crude concentrated sulfuric acid of 60° Bé. until the temperature finally reaches about 250° C. The acid liquor is separated from the insoluble residue, which is then washed with fresh portions of acid. The resulting acid liquor, amounting to about 19 liters, is used for the extraction of radium from a fresh charge of ore of 10 kilos. The acid liquor separated from this second charge is finally used for the treatment of a third charge of 10 kilos of ore. Thus a total of 30 kilos of ore is treated, and about 65 liters of 60° Bé. sulfuric acid used. The acid liquor recovered from the third charge upon dilution with 9 times its volume of water, containing about 10 g. of barium chlorid, yields a precipitate of radium-barium sulfates weighing 93.2 g., and containing about 73.2% of the radium of the ore. The combined precipitates from the water solutions resulting from the treatment of the residue insoluble in concentrated acid, weigh 36.4 g. and contain about 9.4% of the radium in the ore. Hence, about 82.6% of the radium of the ore was recovered. The total weight of the three residues, after treatment with water, is about 25.2 kilos.

From the foregoing description it will be seen that the process of the present invention enables an efficient extraction of radium from carnotite ores to be obtained by the use of a single reagent of relatively low cost, namely, crude concentrated sulfuric acid. The valuable constituents of the ore, namely, radium, vanadium, and uranium, are converted into soluble form. The radium remains in solution in the concentrated acid with a minor portion of the vanadium and uranium, while by far the greater part of the uranium and vanadium readily pass into solution when the acid insoluble residue is treated with water.

The process of the present invention is accordingly a selective extraction process for separating the radium from the uranium and vanadium with which it is associated.

It is a further advantage of the process that distilled water is not required, nor need the water be free from sulfates. When treating radium containing materials with other reagents, the presence of sulfates is prejudicial and hence water free from sulfates must be employed. On the other hand, ordinary stream or well water can be used in the present process for diluting the concentrated sulfuric acid, and for extracting the acid insoluble residue, without prejudice to the process by its sulfate content.

It is a further advantage of the present process that the barium is utilized to carry down the minute quantities of radium that are present in the sulfuric acid extracts. This barium is that normally contained in the ore and extracted at the same time that the radium is extracted. Upon dilution of the concentrated acid, the radium and barium are precipitated together as the radium-barium sulfate.

What I claim is:

1. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, and precipitating the radium sulfate, together with barium sulfate, from the solution by dilution with water; substantially as described.

2. The method of effecting a selective extraction of radium from carnotite ores and concentrates and other suitable radium-containing material, which comprises treating the ore, in a finely divided condition, with hot concentrated sulfuric acid of about 60° Bé., separating the resulting solution from the insoluble residue while still hot, and precipitating the radium sulfate, together with barium sulfate, from the solution by dilution with water; substantially as described.

3. The method of effecting a selective extraction of radium from carnotite ores and concentrates and other suitable radium-containing material, which comprises boiling the ore, in a finely divided condition, with hot concentrated sulfuric acid at a temperature of 230° C. or above, separating the resulting solution from the insoluble residue, and precipitating the radium sulfate, together with barium sulfate, from the solution by dilution with water; substantially as described.

4. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, washing the insoluble residue with concentrated sulfuric acid, and recovering the radium as sulfate from its solutions; substantially as described.

5. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, and precipitating the radium sulfate, together with barium sulfate, from the solution by dilution with water containing barium salts in solution; substantially as described.

6. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, and precipitating the radium sulfate, together with barium sulfate, from the solution by dilution with an amount of water sufficient to precipitate the radium and barium sulfates without substantial precipitation of calcium sulfate; substantially as described.

7. The method of effecting a selective extraction of radium from carnotite ores and concentrates and other suitable radium-containing material, which comprises treating the ore, in a finely divided condition, with hot concentrated sulfuric acid to which small amounts of other suitable acids are present, separating the resulting solution from the insoluble residue, and precipitating the radium-sulfate, together with barium sulfate, from the solution by dilution with water; substantially as described.

8. The method of effecting a selective extraction of radium from carnotite ores and concentrates and other suitable radium-containing material, which comprises boiling the ore with dilute sulfuric acid until an acid of about 60° Bé. is obtained, separating the resulting solution from the insoluble residue, and precipitating the radium sulfate, together with barium sulfate, from the solution by dilution with water; substantially as described.

9. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, extracting further charges of the ore with the resulting solution, and finally precipitating the radium sulfate, together with barium sulfate, from the resulting solution by dilution with water; substantially as described.

10. The method of effecting a selective extraction of radium from carnotite ores and concentrates and other suitable radium-containing material, which comprises treating the ore, in a finely divided condition, with hot concentrated sulfuric acid, separating the resulting solution from the insoluble residue, extracting such residue with water and thereby dissolving the thus soluble constituents including further amounts of radium, and recovering the radium sulfate, together with barium sulfate, from said concentrated and dilute solutions; substantially as described.

11. The method of effecting a selective extraction of radium from carnotite ores and concentrates and other suitable radium-containing material, which comprises treating the ore, in a finely divided condition, with hot concentrated sulfuric acid of about 60° Bé. at a temperature of 230° C. or above, separating the resulting solution from the insoluble residue while still hot, washing the residue with concentrated sulfuric acid, precipitating the radium sulfate, together with barium sulfate, from the acid solutions by dilution with water, concentrating the diluted acid after separation of the precipitate, and utilizing the same for extracting further amounts of ore; substantially as described.

12. The method of effecting a selective extraction of radium from carnotite ores and concentrates and other suitable radium containing material, which comprises treating the material with concentrated sulfuric acid to dissolve out the radium-barium components and recovering the radium sulfate from the solution thus formed.

13. The method of effecting selective extraction of radium from carnotite ores and concentrates and other suitable radium containing material, which comprises treating the material with sulfuric acid of a concentration and at a temperature to dissolve the radium-barium components, and precipitating the radium sulfate together with barium sulfate from the solution, by dilution with water.

14. The method of effecting extraction of radium from carnotite ores and concentrates and other suitable radium containing material, which comprises treating the material with concentrated sulfuric acid, separating the resultant solution from the insoluble residue and separating radium sulfate from said solution; substantially as described.

In testimony whereof I affix my signature.

HERMAN SCHLUNDT.